US012688575B2

(12) United States Patent
Wang et al.

(10) Patent No.: US 12,688,575 B2
(45) Date of Patent: Jul. 21, 2026

(54) METHOD AND DEVICE FOR DETECTING IMAGING CONSISTENCY OF SYSTEM, AND COMPUTER STORAGE MEDIUM

(71) Applicant: CONTEMPORARY AMPEREX TECHNOLOGY (HONG KONG) LIMITED, Hong Kong (CN)

(72) Inventors: Zhiyu Wang, Ningde (CN); Xi Wang, Ningde (CN); Guannan Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 330 days.

(21) Appl. No.: 18/474,262

(22) Filed: Sep. 26, 2023

(65) Prior Publication Data

US 2024/0029240 A1 Jan. 25, 2024

Related U.S. Application Data

(63) Continuation of application No. PCT/CN2023/084549, filed on Mar. 29, 2023.

(30) Foreign Application Priority Data

Jul. 22, 2022 (CN) .......................... 202210866453.7

(51) Int. Cl.
*G06T 7/00* (2017.01)
*G06T 7/11* (2017.01)

(52) U.S. Cl.
CPC ................ *G06T 7/001* (2013.01); *G06T 7/11* (2017.01); *G06T 2207/20021* (2013.01); *G06T 2207/30108* (2013.01); *G06T 2207/30168* (2013.01)

(58) Field of Classification Search
CPC . G06T 7/001; G06T 7/11; G06T 2207/20021; G06T 2207/30108;
(Continued)

(56) References Cited

U.S. PATENT DOCUMENTS

2015/0111078 A1 4/2015 Hosoya et al.
2016/0019008 A1* 1/2016 Matsumoto ........... G06F 3/1256
358/1.15

(Continued)

FOREIGN PATENT DOCUMENTS

CN 108053438 A 5/2018
CN 112329575 A 2/2021
(Continued)

OTHER PUBLICATIONS

International Search Report received in the corresponding International Application PCT/CN2023/084549, mailed May 25, 2023.
(Continued)

*Primary Examiner* — Bobbak Safaipour
(74) *Attorney, Agent, or Firm* — K&L Gates LLP

(57) ABSTRACT

Disclosed, in one embodiment, are a method and device for detecting imaging consistency of a system, and a computer storage medium. The method includes: determining a target region in an image acquired by the system, where the target region is a partial region that includes a target object in the image acquired by the system; obtaining first image information of the target region; and detecting the imaging consistency of the system based on the first image information. By obtaining the first image information of the target region in the image acquired by the system and determining the imaging consistency of the system based on the first image information, this application can effectively detect the imaging consistency of the system and improve accuracy of product detection.

15 Claims, 5 Drawing Sheets

(58) Field of Classification Search
CPC . G06T 2207/30168; G06T 2207/10048; G06T 2207/30136; G06T 2207/30164; G06T 7/0004
See application file for complete search history.

(56) References Cited

U.S. PATENT DOCUMENTS

| | | | | |
|---|---|---|---|---|
| 2020/0273160 A1* | 8/2020 | Zhang | .................... | G06T 7/0012 |
| 2021/0027984 A1* | 1/2021 | Chou | .................... | H01J 37/153 |
| 2021/0035260 A1* | 2/2021 | Li | ........................ | G06V 10/44 |
| 2021/0264639 A1* | 8/2021 | Miginnis | ................ | G03B 43/00 |
| 2021/0341725 A1* | 11/2021 | Han | ....................... | G06T 7/0012 |
| 2022/0026275 A1* | 1/2022 | Asghar | ................ | A61B 5/0077 |

FOREIGN PATENT DOCUMENTS

| | | |
|---|---|---|
| CN | 112597785 A | 4/2021 |
| CN | 112616028 A | 4/2021 |
| CN | 112633200 A | 4/2021 |
| CN | 113642434 A | 11/2021 |
| CN | 114332030 A | 4/2022 |
| CN | 114648749 A | 6/2022 |
| CN | 114983338 A | 9/2022 |
| CN | 115829911 A | 3/2023 |

OTHER PUBLICATIONS

Written Opinion received in the corresponding International Application PCT/CN2023/084549, mailed May 25, 2023.
The first office action received in the corresponding Chinese application 202210866453.7, mailed Jun. 3, 2023.
The extended European search report received in the corresponding European application 23733191.3, mailed on Jun. 11, 2024.
Yapeng Wu et al: "Pole-piece position distance identification of cylindrical lithium-ion battery through x-ray testing technology", Measurement Science and Technology Iop Bristol GB vol. 32 No. 4, p. 1-13.
The second office action received in the corresponding Chinese application 202210866453.7, mailed Sep. 23, 2023.

* cited by examiner

METHOD AND DEVICE FOR DETECTING IMAGING CONSISTENCY OF SYSTEM, AND COMPUTER STORAGE MEDIUM

CROSS-REFERENCE TO RELATED APPLICATIONS

This application is a continuation of International Application No. PCT/CN2023/084549, filed on Mar. 29, 2023, which claims priority to Chinese Patent Application No. 202210866453.7, filed on Jul. 22, 2022 and entitled "METHOD AND DEVICE FOR DETECTING IMAGING CONSISTENCY OF SYSTEM, AND COMPUTER STORAGE MEDIUM", which is incorporated herein by reference in its entirety.

TECHNICAL FIELD

This application relates to the field of image processing, and in particular, to a method and device for detecting imaging consistency of a system, and a computer storage medium.

BACKGROUND

With the development of image processing technology, more and more image processing technologies have been applied in the field of modern industrial manufacturing, for example, in detecting the imaging consistency of a system.

To accurately detect defects of a product, detection images that meet detection criteria need to be acquired. However, the complicated industrial production environment may affect the system in detecting the product. For example, foreign matters may block a light source, and an optical path adjustment device may be dislocated. Consequently, the to-be-detected image acquired by the system does not meet the detection criteria, resulting in inconsistency of imaging of the system and impairing accuracy of product detection.

Therefore, how to effectively detect the imaging consistency of the system is an urgent technical problem to be solved.

SUMMARY

Some embodiments of this application provide a method and device for detecting imaging consistency of a system as well as a computer storage medium to effectively detect the imaging consistency of the system, and in turn, improve accuracy of product detection.

According to a first aspect, a method for detecting imaging consistency of a system is provided. The method includes: determining a target region in an image acquired by the system, where the target region is a partial region that includes a target object in the image; obtaining first image information of the target region; and detecting the imaging consistency of the system based on the first image information.

By obtaining the first image information of the target region in the image and determining the imaging consistency of the system based on the first image information, the technical solution in this embodiment of this application can effectively detect the imaging consistency of the system based on target object information and improve accuracy of product detection.

In some possible implementations, the detecting the imaging consistency of the system based on the first image information includes: determining, if the first image information satisfies a first preset condition, that imaging is consistent in the system; or determining, if the first image information fails to satisfy a first preset condition, that imaging is inconsistent in the system.

In the above implementation, by determining whether the first image information satisfies the first preset condition, this application not only determines whether the imaging of the system is consistent, but also determines the specific attribute that fails to satisfy the first preset condition, and in turn, determines the reasons for inconsistent imaging of the system.

In some possible implementations, the target region is a region of interest in the image. The first image information includes brightness, clarity, and location of the target region. That the first image information satisfies the first preset condition includes: the brightness of the target region falls within a first preset brightness range; the clarity of the target region is greater than or equal to a first preset clarity; and the location of the target region falls within a preset location range.

In the above implementation, by determining whether the brightness, clarity, and location of the region of interest satisfy the first preset condition, this application can not only effectively detect the imaging consistency of the system, but also determine abnormal status of components such as a light source, an optical path adjustment device, and an image acquisition device in the system based on the brightness, clarity, and location of the region of interest.

In some possible implementations, the determining a target region in an image acquired by the system includes: processing the image based on a segmenting and locating method to obtain the region of interest.

In the above implementation, the image is processed by a segmenting and locating method, and therefore, the target object can be effectively recognized, and the region can be segmented based on information on the target object. In this way, the target region can be determined accurately, and the target object accounts for a relatively large proportion of the target region in the image, thereby detecting the consistency of the system more effectively.

In some possible implementations, the target region is a line region in the region of interest in the image, and the line region is formed of lines of the target object. The first image information includes brightness, clarity, and line angle of the target region. The line angle is an angle of the lines of the target object. That the first image information satisfies the first preset condition includes: the brightness of the target region falls within a second preset brightness range; the clarity of the target region is greater than or equal to a second preset clarity; and the line angle of the target region falls within a preset angle range.

In the above implementation, by determining whether the brightness, clarity, and line angle of the line region formed of the lines of the target object satisfy the first preset condition, this application can not only more effectively detect the imaging consistency of the system, but also determine abnormal status of components such as a light source, an optical path adjustment device, and an image acquisition device in the system based on the brightness, clarity, and line angle of the line region.

In some possible implementations, the determining a target region in an image acquired by the system includes: processing the image based on a segmenting and locating method to obtain the region of interest; and segmenting the region of interest semantically to obtain the target region.

In the above implementation, the image is processed by a segmenting and locating method to obtain the region of interest, and the region of interest is segmented semantically to recognize the target object more effectively, and more accurate segmentation is implemented based on information on the target object. In this way, the target region is determined accurately, and almost the whole target region is made to include just the target object, thereby detecting the consistency of the system more effectively.

In some possible implementations, the first image information includes brightness, clarity, and location of the target region as well as brightness, clarity, and a line angle of a line region in the target region. The line region is a line region formed of lines of the target object in the target region. The line angle is an angle of the lines of the target object. That the first image information satisfies the first preset condition includes: the brightness of the target region falls within a first preset brightness range; the clarity of the target region is greater than or equal to a first preset clarity; and the location of the target region falls within a preset location range; the brightness of the line region in the target region falls within a second preset brightness range; the clarity of the line region in the target region is greater than or equal to a second preset clarity; and the line angle of the line region in the target region falls within a preset angle range.

In the above implementation, by determining whether the brightness, clarity, and location of the region of interest and the brightness, clarity, and line angle of the line region satisfy the first preset condition, this application can not only detect the imaging consistency of the system accurately and quickly, but also determine abnormal status of components such as a light source, an optical path adjustment device, and an image acquisition device in the system based on the brightness, clarity, and location of the region of interest and the brightness, clarity, and line angle of the line region.

In some possible implementations, the method for detecting imaging consistency of a system further includes: obtaining second image information of the image acquired by the system. The detecting the imaging consistency of the system includes: detecting the imaging consistency of the system based on the second image information and the first image information.

In the above implementation, the imaging consistency of the system is determined based on the first image information and the second image information. Therefore, the imaging consistency of the system can be detected more comprehensively and effectively based on the image information acquired by the system and the target object information, thereby improving accuracy of product detection.

In some possible implementations, the detecting the imaging consistency of the system based on the second image information and the first image information includes: determining, if the second image information satisfies a second preset condition and the first image information satisfies a first preset condition, that imaging is consistent in the system; or determining, if the second image information fails to satisfy a second preset condition or the first image information fails to satisfy a first preset condition, that imaging is inconsistent in the system.

In the above implementation, the imaging consistency of the system is determined by checking whether the first image information satisfies the first preset condition and whether the second image information satisfies the second preset condition. In this way, not only the imaging consistency of the system is detected more comprehensively and effectively, but also the reasons for inconsistent imaging of the system are determined based on the specific attribute that fails to satisfy the first preset condition and the second preset condition.

In some possible implementations, the second image information includes brightness, clarity, and similarity of the image. That the second image information satisfies the second preset condition includes: the brightness of the image falls within a third preset brightness range; the clarity of the image is greater than or equal to a third preset clarity; and the similarity of the image falls within a preset similarity range.

In the above implementation, by determining whether the brightness, clarity, and similarity of the image satisfy the second preset condition, this application can not only detect the imaging consistency of the system more comprehensively and effectively, but also determine abnormal status of components such as a light source, an optical path adjustment device, and an image acquisition device in the system based on the brightness, clarity, and similarity of the image.

In some possible implementations, the target object is a tab. The target region is a partial region that includes the tab in the image, or the target region is a line region formed of tab lines of the tab in the image.

In the above embodiment, the target region is set to be a partial region that includes the tab in the image, or the target region is set to be a line region formed of tab lines of the tab in the image. In this way, the imaging consistency of the system can be detected effectively based on the tab information or tab line information, and the accuracy of product detection is improved.

According to a second aspect, a device for detecting imaging consistency of a system is provided. The device includes a determining module, an obtaining module, and a detection module. The determining module is configured to determine a target region in an image acquired by the system, where the target region is a partial region that includes a target object in the image. The obtaining module is configured to obtain first image information of the target region. The detection module is configured to detect the imaging consistency of the system based on the first image information.

By obtaining the first image information of the target region in the image and determining the imaging consistency of the system based on the first image information, the technical solution in this embodiment of this application can effectively detect the imaging consistency of the system based on target object information and improve accuracy of product detection.

In some possible implementations, the detection module is configured to: determine, if the first image information satisfies a first preset condition, that imaging is consistent in the system; or determine, if the first image information fails to satisfy a first preset condition, that imaging is inconsistent in the system.

In the above implementation, by determining whether the first image information satisfies the first preset condition, this application not only determines whether the imaging of the system is consistent, but also determines the specific attribute that fails to satisfy the first preset condition, and in turn, determines the reasons for inconsistent imaging of the system.

In some possible implementations, the target region is a region of interest in the image. The first image information includes brightness, clarity, and location of the target region. That the first image information satisfies the first preset condition includes: the brightness of the target region falls within a first preset brightness range; the clarity of the target region is greater than or equal to a first preset clarity; and the location of the target region falls within a preset location range.

In the above implementation, by determining whether the brightness, clarity, and location of the region of interest satisfy the first preset condition, this application can not only effectively detect the imaging consistency of the system, but also determine abnormal status of components such as a light source, an optical path adjustment device, and an image acquisition device in the system based on the brightness, clarity, and location of the region of interest.

In some possible implementations, the determining module is configured to: process the image based on a segmenting and locating method to obtain the region of interest.

In the above implementation, the image is processed by a segmenting and locating method, and therefore, the target object can be effectively recognized, and the region can be segmented based on information on the target object. In this way, the target region can be determined accurately, and the target object accounts for a relatively large proportion of the target region in the image, thereby detecting the consistency of the system more effectively.

In some possible implementations, the target region is a line region in the region of interest in the image, and the line region is formed of lines of the target object. The first image information includes brightness, clarity, and line angle of the target region. The line angle is an angle of the lines of the target object. That the first image information satisfies the first preset condition includes: the brightness of the target region falls within a second preset brightness range; the clarity of the target region is greater than or equal to a second preset clarity; and the line angle of the target region falls within a preset angle range.

In the above implementation, by determining whether the brightness, clarity, and line angle of the line region formed of the lines of the target object satisfy the first preset condition, this application can not only more effectively detect the imaging consistency of the system, but also determine abnormal status of components such as a light source, an optical path adjustment device, and an image acquisition device in the system based on the brightness, clarity, and line angle of the line region.

In some possible implementations, the determining module is configured to: process the image based on a segmenting and locating method to obtain the region of interest; and segment the region of interest semantically to obtain the target region.

In the above implementation, the image is processed by a segmenting and locating method to obtain the region of interest, and the region of interest is segmented semantically to recognize the target object more effectively, and more accurate segmentation is implemented based on information on the target object. In this way, the target region is determined accurately, and almost the whole target region is made to include just the target object, thereby detecting the consistency of the system more effectively.

In some possible implementations, the first image information includes brightness, clarity, and location of the target region as well as brightness, clarity, and a line angle of a line region in the target region. The line region is a line region formed of lines of the target object in the target region. The line angle is an angle of the lines of the target object. That the first image information satisfies the first preset condition includes: the brightness of the target region falls within a first preset brightness range; the clarity of the target region is greater than or equal to a first preset clarity; and the location of the target region falls within a preset location range; the brightness of the line region in the target region falls within a second preset brightness range; the clarity of the line region in the target region is greater than or equal to a second preset clarity; and the line angle of the line region in the target region falls within a preset angle range.

In the above implementation, by determining whether the brightness, clarity, and location of the region of interest and the brightness, clarity, and line angle of the line region satisfy the first preset condition, this application can not only detect the imaging consistency of the system effectively, but also determine abnormal status of components such as a light source, an optical path adjustment device, and an image acquisition device in the system based on the brightness, clarity, and location of the region of interest and the brightness, clarity, and line angle of the line region.

In some possible implementations, the obtaining module is further configured to obtain second image information of the image acquired by the system. The detection module is configured to detect the imaging consistency of the system based on the second image information and the first image information.

In the above implementation, the imaging consistency of the system is determined based on the first image information and the second image information. Therefore, the imaging consistency of the system can be detected more comprehensively and effectively based on the image information acquired by the system and the target object information, thereby improving accuracy of product detection.

In some possible implementations, the detection module is configured to: determine, if the second image information satisfies a second preset condition and the first image information satisfies a first preset condition, that imaging is consistent in the system; or determine, if the second image information fails to satisfy a second preset condition or the first image information fails to satisfy a first preset condition, that imaging is inconsistent in the system.

In the above implementation, the imaging consistency of the system is determined by checking whether the first image information satisfies the first preset condition and whether the second image information satisfies the second preset condition. In this way, not only the imaging consistency of the system is detected more comprehensively and effectively, but also the reasons for inconsistent imaging of the system are determined based on the specific attribute that fails to satisfy the first preset condition and the second preset condition.

In some possible implementations, the second image information includes brightness, clarity, and similarity of the image. That the second image information satisfies the second preset condition includes: the brightness of the image falls within a third preset brightness range; the clarity of the image is greater than or equal to a third preset clarity; and the similarity of the image falls within a preset similarity range.

In the above implementation, by determining whether the brightness, clarity, and similarity of the image satisfy the second preset condition, this application can not only detect the imaging consistency of the system more comprehensively and effectively, but also determine abnormal status of components such as a light source, an optical path adjustment device, and an image acquisition device in the system based on the brightness, clarity, and similarity of the image.

According to a third aspect, a device for detecting imaging consistency of a system is provided. The device includes a processor and a memory. The memory is configured to store a program. The processor is configured to call the program from the memory and run the program to perform the method for detecting imaging consistency of a system according to the first aspect or any possible implementation of the first aspect.

According to a fourth aspect, a computer-readable storage medium is provided, including a computer program. When executed on a computer, the computer program causes the computer to perform the method for detecting imaging consistency of a system according to the first aspect or any possible implementation of the first aspect.

According to a fifth aspect, a computer program product that includes an instruction is provided. When executed by a computer, the instruction causes the computer to perform the method for detecting imaging consistency of a system according to the first aspect or any one possible implementation of the first aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION OF EMBODIMENTS

Figure 1:
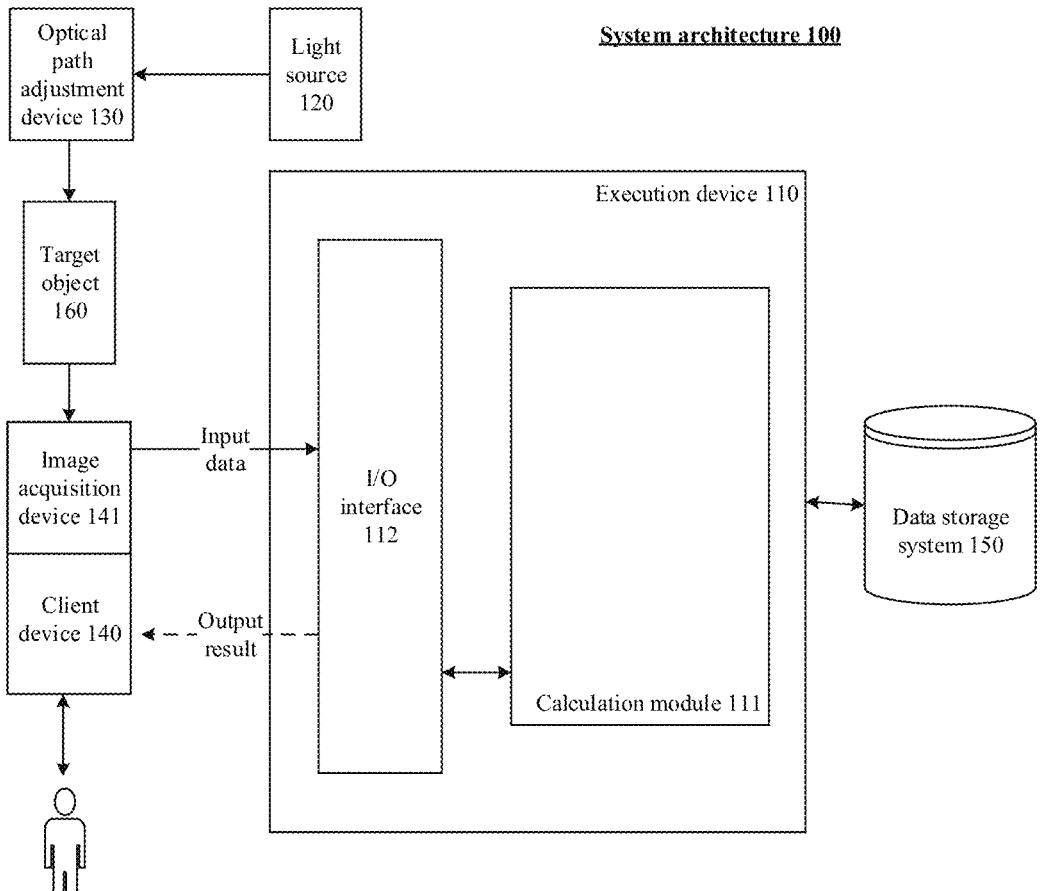
FIG. 1 is a schematic diagram of a system architecture according to an embodiment of this application.

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

Embodiments of this application are applicable to an image processing system, including but not limited to a product based on infrared imaging. A system for detecting imaging consistency of a system is applicable to various electronic devices that contain a device for detecting imaging consistency of a system. The electronic devices may be a personal computer, computer workstation, smartphone, tablet computer, smart camera, media consumer device, wearable device, set-top box, game console, augmented reality (augmented reality, AR)/virtual reality (virtual reality, VR) device, in-vehicle terminal, or the like, without being limited in the disclosed embodiments of this application.

Understandably, specific examples given herein are merely intended to help a person skilled in the art understand embodiments of this application more clearly, but not to limit the scope of embodiments of this application.

Understandably, in various embodiments of this application, the sequence number of a step does not mean the implementation order of the step. The implementation order of each step depends on its functionality and intrinsic logic, but does not constitute any limitation on the implementation process of an embodiment of this application.

Understandably, various embodiments described in this specification may be implemented alone or in combination, without being limited herein.

Unless otherwise defined, all technical and scientific terms used herein bear the same meanings as what is normally understood by a person skilled in the technical field of this application. The terms used herein are merely intended to describe specific embodiments but not to limit the scope of this application. The term "and/or" used herein includes any and all combinations of one or more relevant items recited.

Currently, with the development of industrial technology and image processing technology, more and more factories detect defects of a product by acquiring image information of the product and detecting product defects based on the image information. Although the speed of detecting defects is increased by using image processing technology, the industrial production environment is complicated and each product is of some particularity, and the imaging quality of the system may be affected (for example, overexposure of an image, unclarity of an image, a product not centrally located in an image), thereby resulting in imaging inconsistency of the system and impairing accuracy of product detection.

Therefore, during detection of the imaging consistency of the system, in a case that a product (for example, a tab of a jelly-roll type lithium battery) is highly reflective, multi-layered, and thin, when the multi-layer cross-section of the product is imaged by the system (to generate a multi-layer cross-sectional image), a product region (target region) in the multi-layer cross-sectional image is prone to partial overexposure or displacement (for example, horizontal tilting to some extent) and other problems due to the high reflectivity of the product if the location of a light source or the location of an optical path adjustment device is deviated, thereby impairing the imaging quality of the system, resulting in imaging inconsistency of the system, and in turn, greatly reducing the success rate or accuracy of detecting the imaging consistency of the system.

Based on the above considerations, in order to accurately and quickly detect whether the imaging of the system is consistent, that is, to accurately and quickly detect whether the imaging quality of the system is equalized and all compliant with the detection criteria, an embodiment of this application provides a method for detecting imaging consistency of a system. By obtaining first image information of a partial region (target region) that includes a target object (to-be-detected product) in the image and detecting the imaging consistency of the system based on the first image information, this application can avoid the problem that the partial overexposure near the target object affects a detection result, and can effectively detect the imaging consistency of the system based on target object information and improve accuracy of product detection.

For a better understanding of the technical solutions of this application, the following first briefly describes, with reference to FIG. 1, possible scenarios in which an embodiment of this application is applicable.

As shown in FIG. 1, an embodiment of this application provides a system architecture 100. In FIG. 1, a light source 120 is configured to provide an imaging light source. After an optical path adjustment device 130 reflects a light beam emitted by the light source to a target object 160, refracted light and scattered light of the target object 160 enter an image acquisition device 141 in a client device 140. The image acquisition device 141 acquires an image that includes the target object 160.

An execution device 110 may be a terminal, such as a computer, a mobile phone terminal, a tablet computer, a notebook computer, or the like, or may be a server, a cloud, or the like. In FIG. 1, the execution device 110 is equipped with an input/output (input/output, I/O) interface 112 configured to exchange data with an external device. The image acquisition device 141 may transmit the obtained data (the image that includes the target object) to the execution device 110 through the I/O interface 112.

In some implementations, the client device 140 may be the same device as the execution device 110. For example, the client device 140 and the execution device 110 may both be terminal devices.

In some other implementations, the client device 140 may be a device different from the execution device 110. For example, the client device 140 is a terminal device, but the execution device 110 is a cloud, a server, or another device. The client device 140 may interact with the execution device 110 over a communications network based on any communications mechanism or communications standard. The communications network may be a wide area network, a local area network, a point-to-point connection, or the like, or any combination thereof.

A calculation module 111 of the execution device 110 is configured to perform operations based on the input data (such as the image that includes the target object) received by the I/O interface 112. When the calculation module 111 of the execution device 110 performs relevant operations such as calculation, the execution device 110 may call data, code, and the like in a data storage system 150 to perform corresponding operations, and may store the data, instructions, and the like obtained in the corresponding operations into the data storage system 150.

Finally, the I/O interface 112 returns a processing result, such as the obtained first image information and a detection result, to the client device 140, so as to provide the processing result to the user.

In the circumstance shown in FIG. 1, the input data is user-definable. For example, the user may define the input data on an interface provided by the I/O interface 112. In another circumstance, the client device 140 may automatically send the input data to the I/O interface 112. If the automatic sending of the input data by the client device 140 is subject to the user's permission, the user may set a corresponding permission in the client device 140. The user can view, on the client device 140, a result output by the execution device 110, and the result is rendered by means of display, sound, action, or the like.

It is hereby noted that FIG. 1 is merely a schematic diagram of a system architecture according to an embodiment of this application. The positional relationship between the devices, components, modules, and the like shown in the drawing does not constitute any limitation. For example, in FIG. 1, the data storage system 150 is an external memory to the execution device 110. In other circumstances, the data storage system 150 may be installed in the execution device 110.

Figure 2:
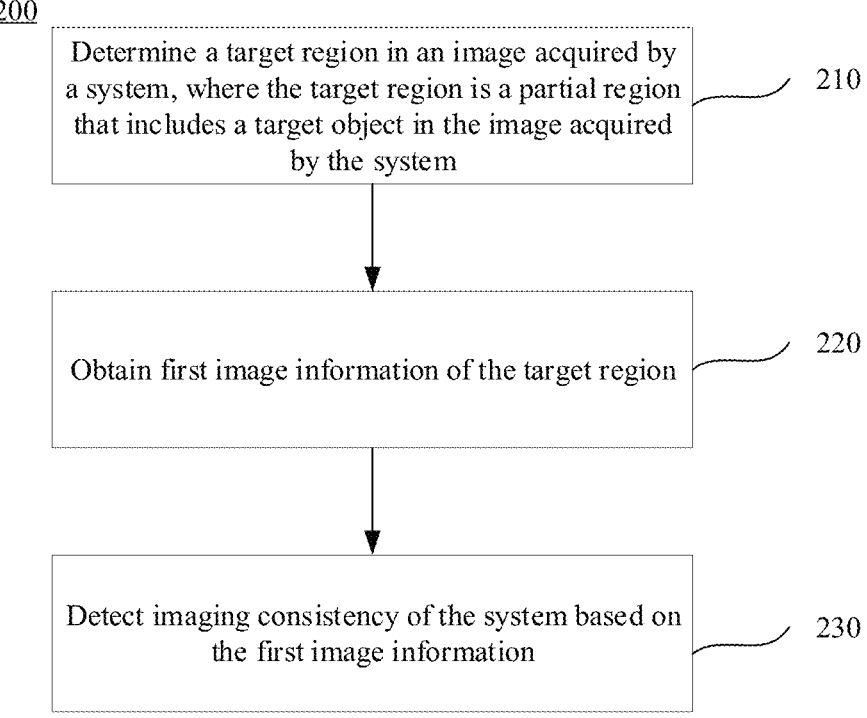
FIG. 2 is a flowchart of a method for detecting imaging consistency of a system according to an embodiment of this application.
Figure 3:
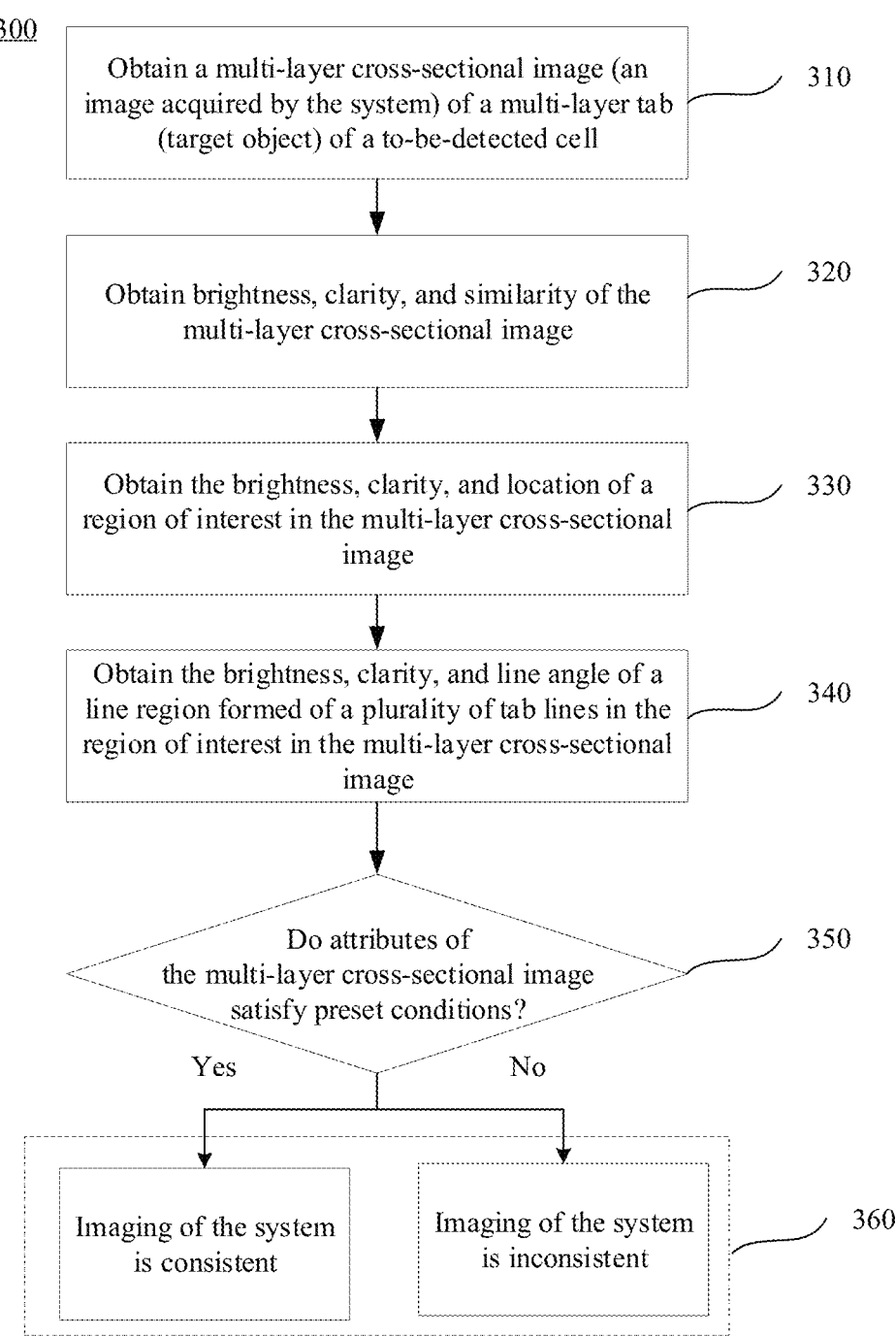
FIG. 3 is a flowchart of a method for detecting imaging consistency in a tab application scenario according to an embodiment of this application.

The following describes a main process of a method for detecting imaging consistency of a system according to an embodiment of this application with reference to FIG. 1 and FIG. 2. The method 200 for detecting the imaging consistency of the system includes the following steps:

210. Determine a target region in an image acquired by a system, where the target region is a partial region that includes a target object in the image acquired by the system.

Specifically, the system may be one of various systems for acquiring images. For example, the image of the target object may be acquired by a charge coupled device (charge coupled device, CCD) camera (such as an image acquisition device 141).

In this embodiment of this application, in order to detect the imaging consistency of the system, in view of the target region in the image, that is, the region that includes the target object in the image, the target image may be determined in various possible ways. For example, contours of the target object are extracted from the image, and the target region is determined and extracted based on the contours of the target object.

220. Obtain first image information of the target region.

The first image information of the target region may be diverse image information of the target region. For example, the first image information may be determined based on a pixel value of the target region, the first image information may be determined based on an edge feature extraction map (grayscale image gradient) of the target image, the first image information may be determined based on center coordinates of the target region, or the first image information may be determined based on a line angle (horizontal angle, vertical angle) in the target region.

230. Detect the imaging consistency of the system based on the first image information.

Specifically, the imaging consistency of the system may be detected based on a relationship between the first image information and a first preset condition.

By obtaining the first image information of the target region in the image and determining the imaging consistency of the system based on the first image information, the technical solution in this application can effectively detect the imaging consistency of the system based on target object information and improve accuracy of product detection.

Optionally, in some embodiments, the detecting the imaging consistency of the system based on the first image information includes: determining, if the first image information satisfies a first preset condition, that imaging is consistent in the system; or determining, if the first image information fails to satisfy a first preset condition, that imaging is inconsistent in the system.

The first image information may include a plurality of attributes such as brightness of the target region, clarity of the target region, location of the target region, and line angle in the target region. If all the attributes in the first image information fall within the corresponding preset range, it is determined that the imaging of the system is consistent; or, if any one of the attributes in the first image information falls outside the corresponding preset range, it is determined that the imaging of the system is inconsistent.

By determining whether the first image information satisfies the first preset condition, this application not only determines whether the imaging of the system is consistent, but also determines which attribute in the first image information falls outside the preset range and finds the reasons for the inconsistent imaging of the system in a case that the imaging of the system is inconsistent.

Optionally, in some embodiments, the target region is a region of interest in the image. The first image information includes brightness, clarity, and location of the target region. That the first image information satisfies the first preset condition the clarity of the target region is greater than or equal to a first preset clarity; and the location of the target region falls within a preset location range.

The region of interest may be a region related to the target object, obtained by using various operators and functions, in the image. Alternatively, the region of interest may be a region outlined in the image acquired by the system, and outlined by a shape of a box, circle, ellipse, irregular polygon, or the like.

For example, a contour of the target object may be extracted from the image. A mask (Mask) region may be generated by detecting the contours of the product, analyzing binary connected components or by other means, and the Region of Interest (Region Of Interest, ROI) may be determined based on the mask region. The brightness of the region of interest is an average pixel value of the region of interest (a sum divided by the number of pixel values, where the sum is a sum of the pixel values of the region of interest). The clarity of the region of interest is a variance of a grayscale image gradient calculated based on a Laplacian operator (the variance of the pixel values of the edge feature extraction map is calculated after an edge feature extraction map is obtained by convolving the Laplacian operator with the region of interest). The location of the region of interest is center coordinates of the region of interest. A region of a larger average pixel value is brighter, and a region of a larger variance is clearer.

Optionally, the first preset brightness range may be determined by the following method: counting the brightness values of the regions of interest in a standard image; sorting the brightness values in descending order of brightness of the regions of interest in the standard image; and manually determining an acceptable brightness range (covering neither the bright value of an overexposed region of interest nor the brightness value of an underexposed region of interest), letting a lower limit of the first preset brightness range be a brightness value of an underexposed region of interest in the standard image (this value is ranked behind in the range), and letting an upper limit of the first preset brightness range be a brightness value of an overexposed region of interest in the standard image (this value is ranked ahead in the range). The first preset clarity may be determined by the following method: counting the clarity values of the regions of interest in the standard image; sorting the clarity values in descending order of clarity of the regions of interest in the standard image; and using a lower limit of manually determined acceptable clarity as the first preset clarity. The preset location range may be determined by the following method: counting location coordinate values of a standard image (the coordinate values at the centers of the regions of interest in the standard image); calculating a mean value and a variance of the location coordinate values of the standard image (the mean value and the variance of the coordinate values at the centers of the regions of interest in the standard image); adding a threefold variance to the mean value of the location coordinate values of the standard image to obtain a sum, and subtracting a threefold variance from the mean value of the location coordinate values of the standard image to obtain a difference; and using the sum and the difference to form the preset location range.

In practical applications, a determining process may be: obtaining the brightness of the region of interest, and then determining whether the brightness of the region of interest falls within a first preset brightness range; obtaining, if the brightness of the region of interest falls within the first preset brightness range, the clarity of the region of interest, and determining whether the clarity of the region of interest is greater than or equal to a first preset clarity; obtaining, if the clarity of the region of interest is greater than or equal to the first preset clarity, the location of the region of interest, and determining whether the location of the region of interest falls within a preset location range; and, determining, if the location of the region of interest falls within the preset location range, that the first image information satisfies the first preset condition.

An alternative determining process is: obtaining the brightness, clarity, and location of the region of interest, and then determining whether the brightness of the region of interest falls within a first preset brightness range, whether the clarity of the region of interest is greater than or equal to a first preset clarity, and whether the location of the region of interest falls within a preset location range; and determining, if the brightness of the region of interest falls within the first preset brightness range, the clarity of the region of interest is greater than or equal to the first preset clarity, and the location of the region of interest falls within the preset location range, that the first image information satisfies the first preset condition.

It is hereby noted that, if the brightness of the target region falls outside the first preset brightness range, it is determined that the light source 120 and/or the optical path adjustment device 130 is abnormal; if the clarity of the target region is less than the first preset clarity, it is determined that the optical path adjustment device 130 and/or the image acquisition device 141 is abnormal; and, if the location of the target region falls outside the preset location range, it is determined that the optical path adjustment device 130 and/or the image acquisition device 141 is abnormal.

In this way, by determining whether the brightness, clarity, and location of the region of interest satisfy the first preset condition, this application can not only effectively detect the imaging consistency of the system, but also determine abnormal status of components such as a light source, an optical path adjustment device, and an image acquisition device in the system based on the brightness, clarity, and location of the region of interest.

Optionally, in some embodiments, the determining a target region in an image acquired by the system includes: processing the image based on a segmenting and locating method to obtain the region of interest.

In these embodiments of this application, the target object in the image acquired by the system may be located first, and then a part that includes the target object is partitioned off to obtain the region of interest. An exemplary determining process is: locating the target object by using an integral image (integral image algorithm), so as to obtain a subimage that includes the target object; and, based on an efficient coarse segmentation algorithm (for example, Fully Convolutional Neural Network (Fully Convolutional Network, FCN)), coarsely segmenting the subimage that includes the target object, so as to obtain the region of interest.

The image is processed by a segmenting and locating method, and therefore, the target object can be effectively recognized, and the region can be segmented based on information on the target object. In this way, an accurate target region is obtained, and the target object accounts for a relatively large proportion of the target region in the image, thereby detecting the consistency of the system more accurately.

Optionally, in some embodiments, the target region is a line region in the region of interest in the image, and the line region is formed of lines of the target object. The first image information includes brightness, clarity, and line angle of the target region. The line angle is an angle of the lines of the target object. That the first image information satisfies the first preset condition includes: the brightness of the target region falls within a second preset brightness range; the clarity of the target region is greater than or equal to a second preset clarity; and the line angle of the target region falls within a preset angle range.

In practical applications, lines (usually plural in number) of the target object in the region of interest in the image may be detected using a line segment detection algorithm (such as Hough Transform algorithm), and a line region formed of the lines of the target object is used as a line region (target region). The brightness and clarity of the line region may be obtained in a way similar to the method of obtaining the brightness and clarity of the region of interest, details of which are omitted here. The line angle of the line region may be determined by the following method: obtaining a horizontal angle or vertical angle of each line of the target object, determining an average rotation angle of the line of the target object based on the horizontal angle or vertical angle of each line of the target object, and using the average rotation angle as a line angle of the line region.

The second preset brightness range may be obtained in a way similar to the method of obtaining the first preset brightness range, and the second preset clarity may be obtained in a way similar to the method of obtaining the first preset clarity, details of which are omitted here. The preset angle range may be determined by the following method: counting the line angles of the line region of the standard image, and determining a preset angle range (for example, 5° to 10°) based on a manually determined acceptable tilting degree of the target object.

In practical applications, a determining process may be: obtaining the brightness of the line region, and then determining whether the brightness of the line region falls within a second preset brightness range; obtaining, if the brightness of the line region falls within the second preset brightness range, the clarity of the line region, and determining whether the clarity of the line region is greater than or equal to a second preset clarity; obtaining, if the clarity of the line region is greater than or equal to the second preset clarity, the line angle of the line region, and determining whether the line angle of the line region falls within a preset angle range; and, determining, if the line angle of the line region falls within the preset angle range, that the first image information satisfies the first preset condition.

An alternative determining process is: obtaining the brightness, clarity, and line angle of the line region, and then determining whether the brightness of the line region falls within a second preset brightness range, whether the line angle of the line region is greater than or equal to a second preset clarity, and whether the line angle of the line region falls within a preset line angle range; and determining, if the brightness of the line region falls within the second preset brightness range, the clarity of the line region is greater than or equal to the second preset clarity, and the line angle of the line region falls within the preset line angle range, that the first image information satisfies the first preset condition.

It is hereby noted that, if the brightness of the target region falls outside the second preset brightness range, it is determined that the light source 120 and/or the optical path adjustment device 130 is abnormal; if the clarity of the target region is less than the second preset clarity, it is determined that the optical path adjustment device 130 and/or the image acquisition device 141 is abnormal; and, if the line angle of the target region falls outside the preset angle range, it is determined that the optical path adjustment device 130 and/or the image acquisition device 141 is abnormal.

In this way, by determining whether the brightness, clarity, and line angle of the line region satisfy the first preset condition, this application can not only detect the imaging consistency of the system effectively, but also determine abnormal status of components such as a light source, an optical path adjustment device, and an image acquisition device in the system based on the brightness, clarity, and location of the region of interest and the brightness, clarity, and line angle of the line region.

Optionally, the determining a target region in an image acquired by the system includes: processing the image based on a segmenting and locating method to obtain the region of interest; and segmenting the region of interest semantically to obtain the target region.

An exemplary determining process is: locating the target object by using an integral image (integral image algorithm), so as to obtain a subimage that includes the target object; and, based on an efficient coarse segmentation algorithm such as Fully Convolutional Neural Network (Fully Convolutional Network, FCN), coarsely segmenting the subimage that includes the target object, so as to obtain the region of interest; semantically segmenting the region of interest, for example, based on Object Region Representation Network (Object Region Representations Networks, OCRnet), so as to obtain a segmented mask image; and obtaining the target region based on the mask image.

In practical applications, the lines of the target object in the region of interest in the image may be detected by calling a function in OpenCV: edges=cv2.HoughLinesP(mask, 1, np.pi/180, 2000, minLineLength=2000, maxLineGap=800). The parameters of the function are described below.

The first parameter: mask (mask image);

The second parameter: distance precision of the line segment, measured in pixels (preset value: 1);

The third parameter: angle precision of the line segment, measured in radians (preset value: np.pi/180);

The fourth parameter: minimum length of the line segment, measured in pixels (preset value: 2000). A line segment is not detected unless the length exceeds 2000. Roughly speaking, the larger the value of this parameter, the longer the detected line segment, and the fewer the number of detected line segments;

The fifth parameter minLineLength: minimum length of the line segment, measured in pixels (preset value: 2000); and The sixth parameter maxLineGap: maximum gap (break) between two line segments in the same direction that qualifies the two line segments as one line segment. When the value of this parameter exceeds the preset value: 800, the two line segments are regarded as one line segment. The larger the value, the larger the break that is allowed on the line segment, and the more likely it is to detect potential straight line segments.

In other words, "edges" are the lines of the target object, and the line region formed of the lines of the target object is the target region.

The image is processed by a segmenting and locating method to obtain the region of interest, and the region of interest is segmented semantically to recognize the target object more effectively, and more accurate segmentation is implemented based on information on the target object. In this way, the target region is determined accurately, and almost the whole target region is made to include just the target object, thereby detecting the consistency of the system effectively.

Optionally, in some embodiments, the first image information includes brightness, clarity, and location of the target region as well as brightness, clarity, and a line angle of a line region in the target region. The line region is a line region formed of lines of the target object in the target region. The line angle is an angle of the lines of the target object. That the first image information satisfies the first preset condition includes: the brightness of the target region falls within a first preset brightness range; the clarity of the target region is greater than or equal to a first preset clarity; the location of the target region falls within a preset location range; the brightness of the line region in the target region falls within a second preset brightness range; the clarity of the line region in the target region is greater than or equal to a second preset clarity; and the line angle of the line region in the target region falls within a preset angle range.

In practical applications, a determining process may be: obtaining the brightness, clarity, and location of the target region, and determining whether the brightness, clarity, and location of the target region satisfy a first preset condition; obtaining, if the brightness, clarity, and location of the target region satisfy the first preset condition, the brightness, clarity, and line angle of the line region in the target region, and determining whether the brightness, clarity, and line angle of the line region in the target region satisfy the first preset condition; and determining, if the brightness, clarity, and line angle of the line region in the target region satisfy the first preset condition, that the first image information satisfies the first preset condition. An alternative determining process is: obtaining the brightness, clarity, and location of the target region as well as the brightness, clarity, and line angle of the line region in the target region, and determining whether all such attributes satisfy the first preset condition; and determining, if all such attributes satisfy the first preset condition, that the first image information satisfies the first preset condition.

By determining whether the brightness, clarity, and location of the region of interest and the brightness, clarity, and line angle of the line region satisfy the first preset condition, this application can not only detect the imaging consistency of the system effectively, but also determine abnormal status of components such as a light source, an optical path adjustment device, and an image acquisition device in the system based on the brightness, clarity, and location of the region of interest and the brightness, clarity, and line angle of the line region.

In some possible embodiments, the method for detecting imaging consistency of a system further includes: obtaining second image information of the image. The detecting the imaging consistency of the system includes: detecting the imaging consistency of the system based on the second image information and the first image information.

The second image information of the image acquired by the system may be diverse image information of the image acquired by the system. For example, the second image information may be obtained based on the pixel value of the image acquired by the system; and the second image information may be obtained based on an edge feature extraction map (grayscale image gradient) of the image acquired by the system. The first image information is obtained based on a histogram of the image acquired by the system and a histogram of the standard image. The imaging consistency of the system may be detected based on a relationship between the second image information and the second preset condition as well as a relationship between the first image information and the first preset condition.

Optionally, in some embodiments, the detecting the imaging consistency of the system based on the second image information and the first image information includes: determining, if the second image information satisfies a second preset condition and the first image information satisfies a first preset condition, that imaging is consistent in the system; or determining, if the second image information fails to satisfy a second preset condition or the first image information fails to satisfy a first preset condition, that imaging is inconsistent in the system.

The imaging consistency of the system is determined by checking whether the first image information satisfies the first preset condition and whether the second image information satisfies the second preset condition. In this way, not only the imaging consistency of the system is detected more comprehensively and effectively, but also the reasons for inconsistent imaging of the system are determined based on the specific attribute that fails to satisfy the first preset condition and the second preset condition.

In some possible embodiments, the second image information includes brightness, clarity, and similarity of the image. That the second image information satisfies the second preset condition includes: the brightness of the image falls within a third preset brightness range; the clarity of the image is greater than or equal to a third preset clarity; and the similarity of the image falls within a preset similarity range.

Optionally, the brightness of the image may be obtained in a way similar to the method of determining the brightness of the region of interest (target region), and the clarity may be obtained in a way similar to the method of determining the clarity of the region of interest, details of which are omitted here. The similarity (correlation) between images may be determined by the following method: calculating a histogram of the image, and calculating the similarity between the histogram of the image and the histogram of the standard image (for example, by using the following metrics: correlation, chi-square, intersection, or Bhattacharyya distance). The higher the similarity, the more similar the image is to the standard image.

The third preset brightness range may be obtained in a way similar to the method of obtaining the first/second preset brightness range, and the third preset clarity may be obtained in a way similar to the method of obtaining the first/second preset clarity, details of which are omitted here. The similarity of the image may be determined based on a threshold that is user-defined according to the actual situation.

In practical applications, a determining process may be: obtaining the brightness, clarity, and similarity of the image, and determining whether the brightness, clarity, and similarity of the image satisfy the second preset condition; obtaining, if the brightness, clarity, and similarity of the image satisfy the second preset condition, the brightness, clarity, and location of the target region, and determining whether the brightness, clarity, and location of the target region satisfy the first preset condition; obtaining, if the brightness, clarity, and location of the target region satisfy the first preset condition, the brightness, clarity, and line angle of the line region in the target region, and determining whether the brightness, clarity, and line angle of the line region in the target region satisfy the first preset condition;

and determining, if the brightness, clarity, and line angle of the line region in the target region satisfy the first preset condition, that the second image information satisfies the second preset condition and the first image information satisfies the first preset condition.

An alternative determining process is: obtaining the brightness, clarity, and similarity of the image, the brightness, clarity, and location of the target region, and the brightness, clarity, and line angle of the line region in the target region, and determining whether the brightness, clarity, and similarity of the image satisfy the second preset condition and whether the brightness, clarity, and location of the target region as well as the brightness, clarity, and line angle of the line region in the target region satisfy the first preset condition; and determining, if the brightness, clarity, and similarity of the image satisfy the second preset condition and the brightness, clarity, and location of the target region as well as the brightness, clarity, and line angle of the line region in the target region satisfy the first preset condition, that the second image information satisfies the second preset condition and the first image information satisfies the first preset condition.

By determining whether the brightness, clarity, and similarity of the image satisfy the second preset condition, this application can not only detect the imaging consistency of the system more comprehensively and effectively, but also more accurately determine abnormal status of components such as a light source, an optical path adjustment device, and an image acquisition device in the system based on the brightness, clarity, and similarity of the image.

Optionally, in some possible embodiments, the target object is a tab. The target region is a partial region that includes the tab in the image, or the target region is a line region formed of tab lines of the tab in the image.

The line region formed of tab lines of the tab may be a region formed of lines in a multi-layer cross-sectional image of the tab of a jelly-roll type lithium battery.

In practical applications, due to characteristics of high reflectivity and thinness, the tab is prone to partial overexposure in the image, thereby resulting in imaging inconsistency of the system. By contrast, in this embodiment of this application, the target region is set to be a partial region that includes the tab in the image, or the target region is set to be a line region formed of tab lines in the partial region that includes the tab in the image. In this way, the imaging consistency of the system can be detected effectively based on the tab information or tab line information, and the accuracy of product detection is improved.

It is hereby noted that, the order of the step of obtaining each attribute of the second image information and determining whether each attribute in the second image information satisfies the corresponding preset range, and the order of the step of obtaining each attribute of the first image information and determining whether each attribute in the first image information satisfies the corresponding preset range, are not limited herein, and may be determined according to actual needs.

For easier understanding by a person skilled in the art, the following describes an embodiment of this application in a specific application scenario. As shown in FIG. 3, FIG. 4, FIG. 5, and FIG. 6, a method 300 for detecting imaging consistency of a system includes the following steps:

310. Obtain a multi-layer cross-sectional image (an image acquired by the system, as shown in FIG. 4) of a multi-layer tab (target object) of a to-be-detected cell.

Figure 4:
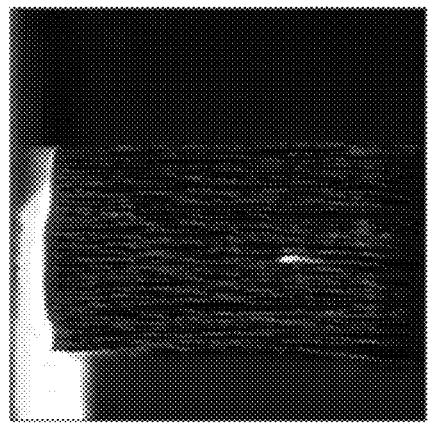
FIG. 4 is an original image of a tab according to an embodiment of this application.

As shown in FIG. 4, a plurality of irregular lines are layers of the multi-layer tab of the to-be-tested cell, and the remainder is the background part. Evidently, the multi-layer tab of the to-be-detected cell accounts for a relatively small proportion in the image, and the background part accounts for a relatively large proportion.

320. Obtain the brightness, clarity, and similarity of the multi-layer cross-sectional image.

330. Obtain the brightness, clarity, and location of a region of interest (the region shown in FIG. 5) in the multi-layer cross-sectional image.

Figure 5:
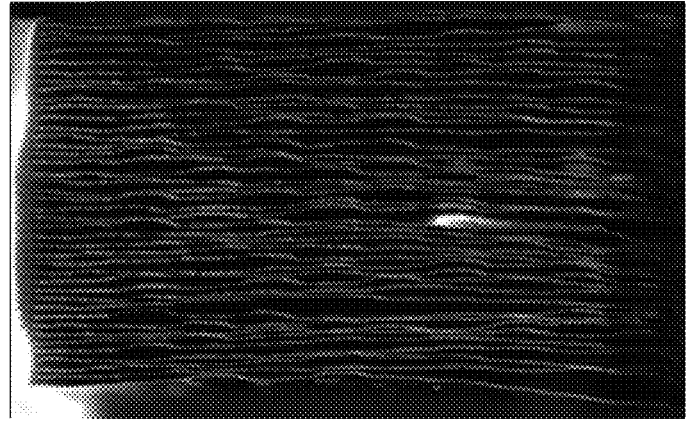
FIG. 5 shows a region of interest in an original image of a tab according to an embodiment of this application.

As shown in FIG. 4 and FIG. 5, the region of interest is a part of the multi-layer cross-sectional image, and includes a large amount of information on the multi-layer tab. The region-of-interest map makes the multi-layer tab account for a relatively large proportion in the image.

340. Obtain the brightness, clarity, and line angle of a line region (the region shown in FIG. 6) formed of a plurality of tab lines in the region of interest in the multi-layer cross-sectional image.

Figure 6:
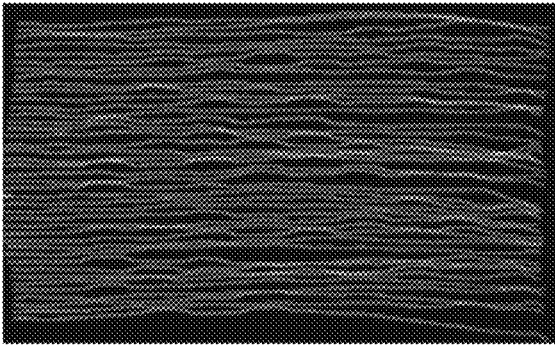
FIG. 6 shows a line region in a region of interest in an original image of a tab according to an embodiment of this application.

As shown in FIG. 6, the region formed of light-colored irregular lines is the line region in the region of interest in the multi-layer cross-sectional image.

350. Determine whether the attributes of the multi-layer cross-sectional image satisfy preset conditions.

Determine whether the brightness of the multi-layer cross-sectional image falls within a third preset brightness range;

Determine whether the clarity of the multi-layer cross-sectional image is greater than or equal to a third preset clarity;

Determine whether the similarity of the multi-layer cross-sectional image falls within a preset similarity range;

Determine whether the brightness of the region of interest in the multi-layer cross-sectional image falls within a first preset brightness range;

Determine whether the clarity of the region of interest in the multi-layer cross-sectional image is greater than or equal to a first preset clarity;

Determine whether the location of the region of interest in the multi-layer cross-sectional image falls within a preset location range;

Determine whether the brightness of the line region in the region of interest in the multi-layer cross-sectional image falls within a second preset brightness range;

Determine whether the clarity of the line region in the region of interest in the multi-layer cross-sectional image is greater than or equal to a second preset clarity; and Determine whether the line angle of the line region in the region of interest in the multi-layer cross-sectional image falls within a preset line angle range.

360. Determine, if the attributes of the multi-layer cross-sectional image satisfy the preset conditions, that the imaging of the system is consistent; or, determine, if an attribute of the multi-layer cross-sectional image fails to satisfy the preset conditions, that the imaging of the system is inconsistent.

It is hereby noted that the relevant image information (the first image information and the second image information) of the acquired multi-layer cross-sectional image is visualized in the image. Moreover, the device in the system can be adjusted based on the detection result so that the status of the system is always in the optimal state without interference from other factors, thereby further improving accuracy of detection.

To sum up, in this embodiment of this application, the first image information and the second image information are obtained, and the imaging consistency of the system is determined by checking whether the first image information satisfies the first preset condition and whether the second image information satisfies the second preset condition. In this way, not only the imaging consistency of the system is detected more comprehensively and effectively, but also the abnormal status of the components such as the light source, optical path adjustment device, and image acquisition device in the system is determined based on the specific attribute that fails to satisfy the first preset condition and the second preset condition.

Figure 7:
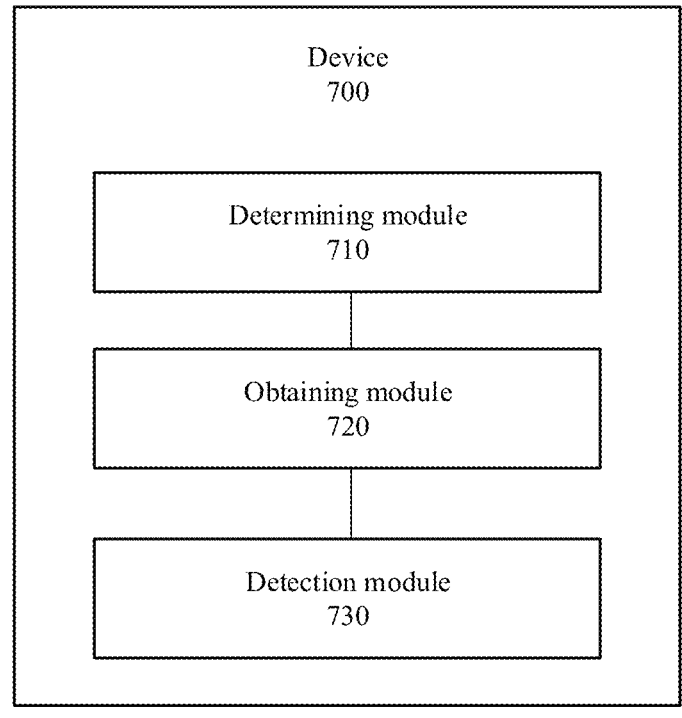
FIG. 7 is a schematic structural block diagram of a device for detecting imaging consistency of a system according to an embodiment of this application.

FIG. 7 is a schematic block diagram of a device 700 for detecting imaging consistency of a system according to an embodiment of this application. The device 700 can execute the method for detecting imaging consistency of a system according to an embodiment of this application. For example, the device 700 may be the execution device 110 described above.

As shown in FIG. 7, the device 700 includes: a determining module 710, an obtaining module 720, and a detection module 730.

The determining module 710 is configured to determine a target region in an image acquired by the system, where the target region is a partial region that includes a target object in the image. The obtaining module 720 is configured to obtain first image information of the target region. The detection module 730 is configured to detect the imaging consistency of the system based on the first image information.

In some possible embodiments, the detection module 730 is configured to: determine, if the first image information satisfies a first preset condition, that imaging is consistent in the system; or determine, if the first image information fails to satisfy a first preset condition, that imaging is inconsistent in the system.

In some possible embodiments, the target region is a region of interest in the image. The first image information includes brightness, clarity, and location of the target region. That the first image information satisfies the first preset condition the clarity of the target region is greater than or equal to a first preset clarity; and the location of the target region falls within a preset location range.

In some possible embodiments, the determining module 710 is configured to: process the image based on a segmenting and locating method to obtain the region of interest.

In some possible embodiments, the target region is a line region in the region of interest in the image, and the line region is formed of lines of the target object. The first image information includes brightness, clarity, and line angle of the target region. The line angle is an angle of the lines of the target object. That the first image information satisfies the first preset condition includes: the brightness of the target region falls within a second preset brightness range; the clarity of the target region is greater than or equal to a second preset clarity; and the line angle of the target region falls within a preset angle range.

In some possible embodiments, the determining module 710 is configured to: process the image based on a segmenting and locating method to obtain the region of interest; and segment the region of interest semantically to obtain the target region.

In some possible embodiments, the first image information includes brightness, clarity, and location of the target region as well as brightness, clarity, and a line angle of a line region in the target region. The line region is a line region formed of lines of the target object in the target region. The line angle is an angle of the lines of the target object. That the first image information satisfies the first preset condition includes: the brightness of the target region falls within a first preset brightness range; the clarity of the target region is greater than or equal to a first preset clarity; and the location of the target region falls within a preset location range; the brightness of the line region in the target region falls within a second preset brightness range; the clarity of the line region in the target region is greater than or equal to a second preset clarity; and the line angle of the line region in the target region falls within a preset angle range.

In some possible embodiments, the obtaining module 720 is further configured to obtain second image information of the image. The detection module 730 is configured to detect the imaging consistency of the system based on the second image information and the first image information.

In some possible embodiments, the detection module 730 is configured to: determine, if the second image information satisfies a second preset condition and the first image information satisfies a first preset condition, that imaging is consistent in the system; or determine, if the second image information fails to satisfy a second preset condition or the first image information fails to satisfy a first preset condition, that imaging is inconsistent in the system.

In some possible embodiments, the second image information includes brightness, clarity, and similarity of the image. That the second image information satisfies the second preset condition includes: the brightness of the image falls within a third preset brightness range; the clarity of the image is greater than or equal to a third preset clarity; and the similarity of the image falls within a preset similarity range.

Figure 8:
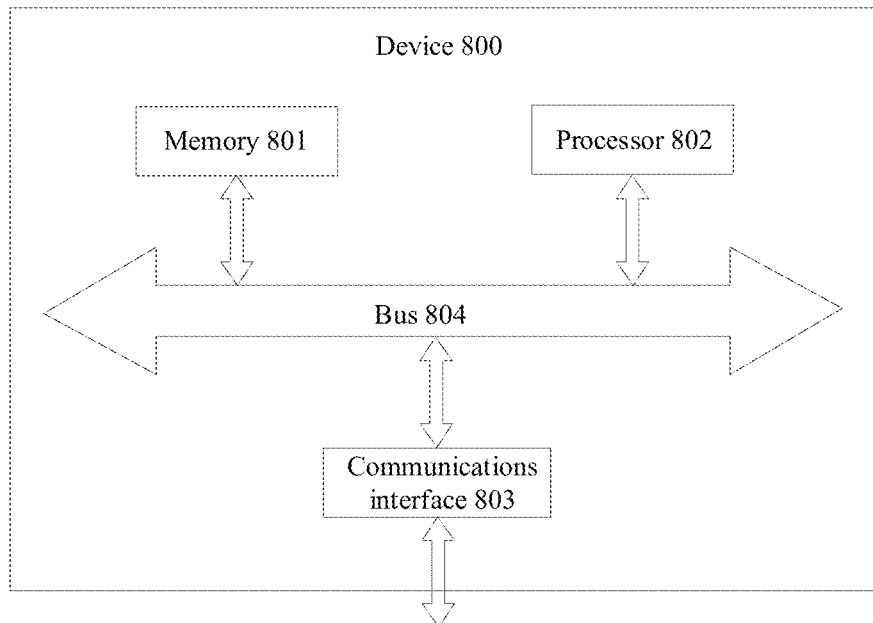
FIG. 8 is a schematic structural hardware diagram of a device for detecting imaging consistency of a system according to an embodiment of this application.

FIG. 8 is a schematic structural hardware diagram of a device for detecting imaging consistency of a system according to an embodiment of this application. The device 800 for detecting imaging consistency of a system shown in FIG. 8 includes a memory 801, a processor 802, a communications interface 803, and a bus 804. The memory 801, the processor 802, and the communications interface 803 are connected to each other by the bus 804 to implement communications connection between each other.

The memory 801 may be a read-only memory (read-only memory, ROM), a static storage device, or a random access memory (random access memory, RAM). The memory 801 may store a program. When the program stored in the memory 801 is executed by the processor 802, the processor 802 and the communications interface 803 are configured to perform steps of the method for detecting imaging consistency of a system according to an embodiment of this application.

The processor 802 may be a general-purpose central processing unit (central processing unit, CPU), a microprocessor, an application specific integrated circuit (application specific integrated circuit, ASIC), a graphics processing unit (graphics processing unit, GPU), or one or more integrated circuits. The processor is configured to perform relevant programs to implement the functions of units in the device for detecting imaging consistency of a system according to an embodiment of this application or perform the method for detecting imaging consistency of a system according to an embodiment of this application.

Alternatively, the processor 802 may be an integrated circuit chip capable of processing signals. In an implementation process, the steps of the method for detecting imaging consistency of a system according to an embodiment of this application may be performed by an integrated logic circuit in the hardware form or an instruction in the software form in the processor 802.

The processor 802 may be a general-purpose processor, a digital signal processor (digital signal processing, DSP), an ASIC, a field programmable gate array (field programmable gate array, FPGA), or another programmable logic device, a discrete gate, or a transistor logic device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware processor, or performed by a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 801. The processor 802 reads the information in the memory 801, and works together with hardware to perform the functions of the units included in the device for detecting imaging consistency of a system according to an embodiment of this application, or perform the method for detecting imaging consistency of a system according to an embodiment of this application.

The communications interface 803 may use, but without being limited to, a transmit-and-receive device such as a transceiver to implement communication between the device 800 and another device or a communications network. For example, traffic data of an unknown device may be obtained through the communications interface 803.

The bus 804 may include a path configured to transfer information between components (for example, memory 801, processor 802, and communications interface 803) of the device 800.

It is hereby noted that although the device 800 shown in the drawing includes just a memory, a processor, and a communications interface, a person skilled in the art understands that the device 800 in specific implementations may include other components required for normal operation. In addition, a person skilled in the art understands that the device 800 may further include a hardware component configured to implement another additional function as specifically required. Moreover, a person skilled in the art understands that the device 800 may include just the components necessary to implement an embodiment of this application, but without including all components shown in FIG. 8.

An embodiment of this application further provides a computer-readable storage medium configured to store program code executable by a device. The program code includes an instruction to perform the steps of the method for detecting imaging consistency of a system.

An embodiment of this application further provides a computer program product. The computer program product includes a computer program stored on a computer-readable storage medium. The computer program includes a program instruction. When executed on a computer, the program instruction causes the computer to perform the method for detecting imaging consistency of a system.

The computer-readable storage medium may be a transitory computer-readable medium or a non-transitory computer-readable storage medium.

A person skilled in the art is clearly aware that for convenience and brevity of description, detailed working processes of the device, the computer-readable storage medium, and the computer program product described above may be learned by referring to the corresponding process in the foregoing method embodiment, details of which are omitted here.

In the several embodiments provided in this application, it is understandable that the disclosed device and method may be implemented in other manners. For example, the described device embodiment is merely illustrative. For example, the division of the device into several units is merely a type of logic function division, and the device may be divided in other manners in practical implementations. For example, a plurality of units or components may be combined or integrated into another system, or some features may be ignored or skipped. In addition, a mutual coupling or direct coupling or communications connection illustrated or discussed herein may be an indirect coupling or communications connection implemented through some interfaces, devices, or units, and may be in electrical, mechanical or other forms.

The terms used herein are merely used to describe an embodiment but not to limit the claims. Unless otherwise expressly specified in the context, a noun in the singular form preceded by "a", "an", or "the" used in the description of an embodiment or claims is intended to include the plural form of the noun. Similarly, the term "and/or" used herein means any and all possible combinations of one or more relevant items recited. In addition, when used in this application, the terms "include" and "comprise" mean the presence of stated features, entirety, steps, operations, elements, and/or components, but without excluding the presence or addition of one or more other features, entirety, steps, operations, elements, components, and/or any combination thereof.

The aspects, implementation manners, implementations, or features in a described embodiment can be used alone or in any combination. Each aspect of an embodiment described herein may be implemented by software, hardware, or a combination of hardware and software. The described embodiment may be embodied by a computer-readable medium that stores computer-readable code. The computer-readable code includes an instruction executable by at least one computing device. The computer-readable medium may be correlated with any data storage device capable of storing data that is readable by a computer system. Examples of the computer-readable media may include a read-only memory, a random-access memory, a compact disc read-only memory (Compact Disc Read-Only Memory, CD-ROM), a hard disk drive (Hard Disk Drive, HDD), a digital video disc (Digital Video Disc, DVD), magnetic tape, an optical data storage device, and the like. The computer-readable medium may be distributed in a computer system connected over a network so that the computer-readable code can be stored and executed in a distributed manner.

The foregoing technical description may be read by reference to the drawings appended hereto. The drawings form a part hereof and have illustrated the implementations in accordance with the described embodiments. Although the embodiments are described in sufficient detail to enable a person skilled in the art to implement the embodiments, the embodiments are non-restrictive so that other embodiments can be used, and changes may be made to the embodiments without departing from the scope of the described embodiments. For example, the order of operations illustrated in a flowchart is non-restrictive, and therefore, the order of two or more operations illustrated in the flowchart and described with reference to the flowchart may be changed according to several embodiments. As another example, in several embodiments, one or more operations illustrated in the flowchart and described with reference to the flowchart are optional or deletable. In addition, some steps or functions may be added to and embodiment disclosed herein, or the order between two or more steps may be permuted. All such variations are considered to be included in the disclosed embodiments and claims.

Moreover, terms are used in the foregoing technical description to enable a thorough understanding of the described embodiments. However, undue detail is not required to implement the described embodiments. Therefore, the foregoing description of embodiments is rendered for purposes of interpretation and description. The embodiments rendered in the foregoing description and the examples disclosed according to such embodiments are provided separately to add a context for ease of understanding of the described embodiments. The specification described above is not intended to be exhaustive or to limit the described embodiments to a precise form of this application. Several modifications, alternatives, and variations may be made based on the foregoing teachings. In some circumstances, well-known process steps have not been described in detail in order not to unnecessarily obscure the described embodiments. Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A method for detecting imaging consistency of a system, wherein the method comprises:

determining a target region in an image acquired by the system, wherein the target region is a partial region that comprises a target object in the image, wherein the target object is a tab for a battery, and the target region is a region of interest in the image, the region of interest comprising the tab in the image;

obtaining first image information of the target region, wherein the first image information comprises brightness, clarity, and location of the target region; and detecting the imaging consistency of the system based on the first image information, wherein detecting the imaging consistency of the system based on the first image information comprises:

determining, if the first image information satisfies a first preset condition, that imaging is consistent in the system;

determining, if the first image information fails to satisfy a first preset condition, that imaging is inconsistent in the system; and determining an abnormal status of at least one of a light source, an optical path adjustment device, and an image acquisition device in the system when the first image information fails to satisfy the first preset condition, wherein that the first image information satisfies the first preset condition comprises:

the brightness of the target region falls within a first preset brightness range;

the clarity of the target region is greater than or equal to a first preset clarity; and the location of the target region falls within a preset location range; and wherein, the light source and/or the optical path adjustment device is determined to be abnormal when the brightness of the target region falls outside the first preset brightness range;

the optical path adjustment device and/or the image acquisition device is determined to be abnormal when the clarity of the target region is less than the first preset clarity; and the optical path adjustment device and/or the image acquisition device are determined to be abnormal when the location of the target region falls outside the preset location range.

2. The method according to claim 1, wherein the determining a target region in an image acquired by the system comprises:

processing the image based on a segmenting and locating method to obtain the region of interest.

3. The method according to claim 1, wherein the target region is a line region in the region of interest in the image, and the line region is formed of lines of the target object; the first image information comprises brightness, clarity, and line angle of the target region; the line angle is an angle of the lines of the target object; and that the first image information satisfies the first preset condition comprises:

the brightness of the target region falls within a second preset brightness range;

the clarity of the target region is greater than or equal to a second preset clarity; and the line angle of the target region falls within a preset angle range.

4. The method according to claim 3, wherein the determining a target region in an image acquired by the system comprises:

processing the image based on a segmenting and locating method to obtain the region of interest; and segmenting the region of interest semantically to obtain the target region.

5. The method according to claim 1, wherein the first image information comprises brightness, clarity, and location of the target region as well as brightness, clarity, and a line angle of a line region in the target region; the line region is a line region formed of lines of the target object in the target region; the line angle is an angle of the lines of the target object; and that the first image information satisfies the first preset condition comprises:

the brightness of the target region falls within a first preset brightness range;

the clarity of the target region is greater than or equal to a first preset clarity; and the location of the target region falls within a preset location range;

the brightness of the line region in the target region falls within a second preset brightness range;

the clarity of the line region in the target region is greater than or equal to a second preset clarity; and the line angle of the line region in the target region falls within a preset angle range.

6. The method according to claim 1, wherein the method further comprises:

obtaining second image information of the image; and the detecting the imaging consistency of the system comprises:

detecting the imaging consistency of the system based on the second image information and the first image information.

7. The method according to claim 6, wherein the detecting the imaging consistency of the system based on the second image information and the first image information comprises:

determining, if the second image information satisfies a second preset condition and the first image information satisfies a first preset condition, that imaging is consistent in the system; or determining, if the second image information fails to satisfy a second preset condition or the first image information fails to satisfy a first preset condition, that imaging is inconsistent in the system.

8. The method according to claim 7, wherein the second image information comprises brightness, clarity, and similarity of the image, and that the second image information satisfies the second preset condition comprises:

the brightness of the image falls within a third preset brightness range;

the clarity of the image is greater than or equal to a third preset clarity; and the similarity of the image falls within a preset similarity range.

9. The method according to claim 1, wherein the target region is a line region formed of tab lines of the tab in the image.

10. A device for detecting imaging consistency of a system, wherein the device comprises a processor and a memory, the memory is configured to store a program, and the processor is configured to call the program from the memory and run the program to perform the method for detecting imaging consistency of a system according to claim 1.

11. A non-transitory computer-readable storage medium, wherein the non-transitory storage medium stores a computer program, and, when executed on a computer, the computer program causes the computer to perform the method for detecting imaging consistency of a system according to claim 1.

12. The method according to claim 1, wherein the first preset brightness range, the first preset clarity, and the preset location range are determined based on brightness values, clarity values, and coordinate values of regions of interest in a standard image acquired under a normal status the system.

13. The method according to claim 1, wherein obtaining the first image information of the target region comprises:

calculating the brightness of the target region as an average pixel value of the target region;

calculating the clarity of the target region as a variance of a grayscale image gradient obtained by convolving a Laplacian operator with the target region; and obtaining the location of the target region as center coordinates of the target region.

14. The method according to claim 1, wherein detecting the imaging consistency of the system further comprises:

generating a detection result; and adjusting the system based on the detection result.

15. The method according to claim 8, wherein the similarity between the image and a standard image is determined by calculating a histogram of the image and a histogram of the standard image, and calculating a similarity between the histogram of the image and the histogram of the standard image based on at least one of correlation, chi-square, intersection, or Bhattacharyya distance.

* * * * *